United States Patent [19]
Fukuoka et al.

[11] Patent Number: 5,215,415
[45] Date of Patent: Jun. 1, 1993

[54] CUTTING INSERT

[75] Inventors: Hitoshi Fukuoka; Katsuhiko Sato; Yuichi Kodera, all of Anpachi, Japan

[73] Assignee: Mitsubishi Materials Corporation, Tokyo, Japan

[21] Appl. No.: 661,292

[22] Filed: Feb. 27, 1991

[30] Foreign Application Priority Data

| Feb. 27, 1990 | [JP] | Japan | 2-46689 |
| Feb. 27, 1990 | [JP] | Japan | 2-46690 |
| Feb. 27, 1990 | [JP] | Japan | 2-46691 |
| Feb. 27, 1990 | [JP] | Japan | 2-46692 |

[51] Int. Cl.$^5$ ................... B23B 27/22; B23B 27/16
[52] U.S. Cl. ................... 407/116; 407/114; 407/119
[58] Field of Search ............. 407/119, 115, 116, 114

[56] References Cited

U.S. PATENT DOCUMENTS

| 2,053,977 | 9/1936 | Taylor | 407/119 X |
| 2,309,371 | 1/1943 | Wissler | 407/115 X |
| 3,781,956 | 1/1974 | Jones et al. | 407/116 X |
| 3,792,514 | 2/1974 | Ushijima . | |
| 4,437,800 | 3/1984 | Araki et al. . | |
| 4,959,929 | 10/1990 | Burnand et al. | 407/119 X |

FOREIGN PATENT DOCUMENTS

| 2231631 | 2/1973 | Fed. Rep. of Germany . | |
| 3321982 | 10/1984 | Fed. Rep. of Germany . | |
| 2271894 | 12/1975 | France . | |
| 73390 | 6/1979 | Japan | 407/116 |
| 607659 | 5/1978 | U.S.S.R. | 407/119 |
| 2037629 | 7/1980 | United Kingdom . | |
| 2086430 | 5/1982 | United Kingdom . | |

Primary Examiner—Steven C. Bishop
Attorney, Agent, or Firm—Cushman, Darby & Cushman

[57] ABSTRACT

In a cutting insert, a base plate is formed into a polygonal configuration having a plurality of corners. At least one cutting-edge element is mounted on an upper surface of the corner of the base plate. The cutting-edge element is composed of a high-hardness sintered section and a super-hard sintered section which are superimposed one upon the other. The cutting-edge element is brazed to the upper surface of the corner of the base plate under such a condition that the super-hard sintered section is exposed to an upper surface of the base plate. The super-hard sintered section has its upper surface which is formed therein with a chip breaker having a surface roughness within a range of from 0.5S to 10S. Furthermore, in a polygonal cutting insert having a plurality of corners which have formed therein respective chip breakers, at least one of the chip breakers is different in form from the remaining chip breakers.

50 Claims, 12 Drawing Sheets

CUTTING INSERT

BACKGROUND OF THE INVENTION

The present invention relates to a cutting insert in which at least one cutting-edge element, made of a sintered section containing a super-hard substance such as diamond, or the like, is mounted on a corner of a base plate.

Conventionally, the cutting insert of the kind referred to above has formed therein a chip breaker of a superior finely finished surface in order to enable the discharge of chips in a superior manner.

However, the conventional cutting insert has a drawback or disadvantage in that it is difficult for the chips to be curled into spiral form by the chip breaker.

In order to solve the above-discussed problem, various experiments have been performed. As a result, the following knowledge has been obtained. That is, in the case where a super-hard sintered section is used, the cutting quality or sharpness is improved, and the cutting resistance is reduced. In addition thereto, since the cutting insert is formed such that the surface roughness of the chip breaker is extremely low, the chips flow extremely smoothly on and along the chip breaker. Thus, the chips are discharged without being curled on the chip breaker; that is, it is difficult for the chips to be curled.

Apart from the above, cutting inserts are conventionally known in which a plurality of chip breakers of identical form are provided respectively at the corners of a base plate.

In the cutting insert constructed as above, the cutting insert is replaced by other types depending on the kind of cutting, such as rough cutting, finishing, and the like, to be performed.

However, the conventional cutting insert described above has the following problem: since the chip breakers are identical in form to each other, the cutting inserts must be replaced with other ones, when rough cutting is completed and subsequent finishing is to be continuously performed.

Thus, the following problem arises. That is, the cutting operation is troublesome and cumbersome, and operational efficiency is reduced.

SUMMARY OF THE INVENTION

It is therefore an object of the invention to provide a cutting insert in which resistance is given or imparted to the flow of chips to facilitate curling of the chips.

It is another object of the invention to provide a cutting insert in which changing the position of the cutting insert enables various types of cutting such as rough cutting, finishing, and the like, to be performed without the necessity of replacement of the cutting inserts with other types.

According to the invention, there is provided a cutting insert comprising a base plate of polygonal configuration having a plurality of corners, and at least one cutting-edge element mounted on an upper surface of a corner of the base plate, wherein the cutting-edge element is composed of a very hard sintered section and a super-hard sintered section, which are superimposed one upon the other, the cutting-edge element being brazed to the upper surface of the corner of the base plate in such a manner that the super-hard sintered section is exposed on an upper surface of the base plate, and wherein the super-hard sintered section has an upper surface in which is formed therein a chip breaker whose surface roughness is within a range of from 0.5S to 10S.

Here, the reason the surface roughness of the chip breaker is set in the range of from 0.5S to 10S is that if the surface roughness is less than 0.5S, the sliding resistance of chips sliding on and along the chip breaker is reduced so that the chips will curl with difficulty; whereas, if the surface roughness is more than 10S, the sliding resistance of the chips increases so that the ability to discharge chips is reduced.

Furthermore, according to the invention, there is also provided a cutting insert wherein the cutting-edge element has a cutting edge, and wherein the chip breaker has two portions, one of the portion nearest said cutting edge having a surface roughness of at most 0.8S over 5% to 50% of the width of said chip breaker and remaining portion having a surface roughness of from 0.5S to 10S.

Hereafter, the reason why the surface roughness is at most 0.8S is that, if the surface roughness exceeds 0.8S, chipping, welding, or fusing, and the like, are liable to occur in and on the cutting edge. Moreover, the reason why it is preferable that the 0.8S portion of the chip breaker nearest the cutting edge have a width between 5% and 50% of the width of the chip breaker, is that, if the width of this portion of the chip breaker is less than 5%, it will be difficult to process a work to a value less than 0.8S. On the other hand, the reason why the width of the portion of the chip breaker is more than 50% is as follows. That is, even if the work is so processed to have a value less than 0.8S, the advantages of prevention of chipping, and the like, will be lessened.

Thus, in the cutting insert according to the invention, since the surface roughness of the chip breaker is so formed as to have a value within the range of from 0.5S to 10S, the chips are subjected to the sliding resistance from the chip breaker so that the chip will be curled. In other words, the cutting resistance can be given to the chips from the surface of the chip breaker, making it possible to curl the chips spirally.

Furthermore, in the case where the portion of the chip breaker adjacent to the cutting edge is formed to a value of at most 0.8S, welding or fusion will be unlikely on the cutting edge, and chipping will also be unlikely. Thus, an angle contained between the cutting face and a flank, that is the angle of the cutting edge, can be formed sharp, making it possible to reduce the cutting resistance. Furthermore, since the portion of the chip breaker adjacent to the cutting edge is so formed as to have a surface roughness of at most 0.8S, a remarkable improvement is produced in that chipping, and the like, of the cutting edge can furthermore securely be prevented from occurring.

Preferably, the corner of the base plate has formed therein a cut-out, the upper surface of the corner of the base plate serving as a bottom surface of the cut-out; and the high-hardness sintered section and the super-hard sintered section are superimposed one upon the other in a direction parallel to the bottom surface of the cut-out such that the super-hard sintered section is located at a periphery of the base plate.

According to the above-described cutting insert, since the super-hard sintered section, which is expensive, is arranged only at the corner of the peripheral surface of the cutting insert, there can be produced such an advantage that a potential reduction in cost may be obtained.

Preferably, the cutting insert comprises a plurality of cutting-edge elements mounted respectively on upper surfaces of the respective corners of the base plate.

With the above arrangement, since the cutting-edge elements are mounted respectively on the corners of the base plate, it is possible to cut a work successively by the corners of the base plate. Thus, as compared with a cutting insert wherein only one corner can be used, the above-described cutting insert is superior in economical efficiency. Furthermore, since it is possible to reduce the total stock, there can be produced such an advantage that control or management of tools can be facilitated.

Preferably, each of the chip breakers has a width of 1.0 mm to 3.0 mm at the forward end of the cutting edge. If the width is less than 1.0 mm, the chips are discharged without being curled on the chip breaker since the length of the chips is too short to be given enough sliding resistance from the surface of the chip breaker. On the other hand, if the width exceeds 3.0 mm, the cutting load exerted by the sliding resistance of the chips become higher than that of the ordinary cutting.

Furthermore, according to the invention, there is provided a polygonal cutting insert having a plurality of corners which are formed therein with respective chip breakers, wherein at least one of the chip breakers is different in shape from the remaining chip breakers.

With the above arrangement of the invention, since the chip breakers differing in shape from each other are formed respectively in the corners of the base plate, a change of position of the corners makes it possible to cope with various types of cutting such as rough cutting, finishing, and the like. Accordingly, in the case, for example, where rough cutting is changed to finishing, it is not required to replace the cutting insert with other ones. Thus, it is possible to enhance operational efficiency.

The cutting-insert body is made of cemented carbide and is triangular in shape.

Preferably, the cutting insert comprises a cutting-insert body having corners. The cutting-insert body is composed of a high-hardness sintered section and a super-hard sintered section which are superimposed one upon the other.

With the above-arrangement of the invention, a change of position of the corners makes it possible to cope with various cuttings such as rough cutting, finishing, and the like. Furthermore, since the super-hard sintered section is arranged only adjacent to the flank of the upper surface, cutting resistance and cutting quality or sharpness can be improved, products may thereby be produced at reduced cost.

DESCRIPTION OF THE EMBODIMENTS

Figure 1:
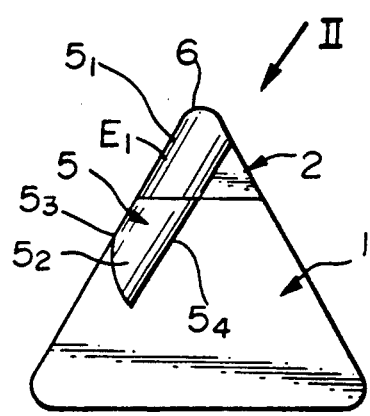
FIG. 1 is a top plan view of a cutting insert according to a first embodiment of the invention.

Various embodiments of the invention will be described below in detail. In this connection, like or similar components and parts will be designated by the same or like reference numerals throughout the specification, and the description of the like or similar components and parts will be omitted to avoid repetition.

Figure 2:
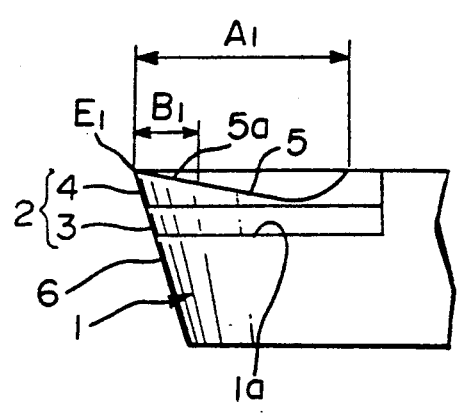
FIG. 2 is an enlarged fragmentary view as viewed from the arrow II in FIG. 1.

Referring first to FIGS. 1 and 2, there is shown a cutting insert according to a first embodiment of the invention. The cutting insert comprises a base plate 1 which is of a triangular form having three corners 6. The base plate 1 is made of steel, cemented carbide, or the like. One of the corners 6 of the base plate 1 has formed therein a cut-out 1a. A cutting-edge element 2 is mounted on an upper surface of the corner 6 of the base plate 1. The upper surface of the corner 6 of the base plate 1 serves as a bottom surface of the cut-out 1a.

The cutting-edge element 2 is composed of a high-hardness sintered section 3 and a super-hard sintered section 4 which are superimposed one upon the other in a direction perpendicular to the bottom surface of the cut-out 1a. The high-hardness sintered section 3 is made of cemented carbide whose main component is tungsten carbide (WC), while the super-hard sintered section 4 has as its main component diamond, cubic boron nitride (CBN), or the like. The cutting-edge element 2 is exposed to the upper surface of the base plate 1 such that the upper surface of the super-hard sintered section 4 is substantially flush with the upper surface of the base plate 1.

The super-hard sintered section 4 has its upper surface which is formed with a chip breaker 5. The chip breaker 5 has a first section $5_1$ formed in the upper surface of the super-hard sintered section 4 and a second section $5_2$ formed in the upper surface of the base plate 1.

The cutting-edge element 2 has a cutting edge $E_1$. The chip breaker 5 has a leading edge $5_3$ serving as the cutting edge $E_1$ of the cutting-edge element 2, and a trailing edge $5_4$ extending in parallel relation to the leading edge $5_3$. The a straight distance $A_1$ from the cutting edge $E_1$ to the trailing edge $5_4$ shows the width of the chip breaker 5. The preferable distance $A_1$ is of 1.0 mm to 3.0 mm away from the cutting edge $E_1$. The upper surface of the cutting-edge element 2 has a portion extending from the forward end of the cutting edge $E_1$ to a location on the upper surface of the cutting-edge element 2, which is spaced from the forward end of the cutting edge $E_1$ through a straight distance $B_1$. The portion of the upper surface of the cutting-edge element 2 is polished to form a polished portion 5a. The polished portion 5a has a surface roughness equal to or less than 0.8S. The remaining portion of the chip breaker 5 has a surface roughness of from 0.5S to 10S, where S is equivalent to $\mu m\ R_{max}$, or simply $\mu m$ by means of electric discharge machining or polishing. In this connection, it is preferable that the remaining portion of the chip breaker 5 (except for the polished portion 5a) has a surface roughness of between 1.5S to 2.0S. In addition, it is preferable that the polished portion 5a has a width $B_1$ which is from 5% to 50% of the width $A_1$ of the chip breaker 5.

The manufacturing procedure for the cutting insert constructed as above will next be described.

First, the high-hardness sintered section 3 and the super-hard sintered section 4 are chemically joined to each other while being sintered simultaneously, thereby forming an element having a certain measure of extent. A triangular element is brought down out of the aforesaid element, thus, forming the cutting-edge element 2.

The triangular cutting-edge element 2 is brazed to the cut-out 1a in the base plate 1 such that the upper surface of the cutting-edge element 2 is substantially flush with the upper surface of the base plate 1. Subsequently, the cutting insert is polished on its upper, lower, and peripheral surfaces.

Subsequently, the chip breaker 5 is formed by electric discharge machining or polishing. Lastly, the polished portion 5a, whose surface roughness is equal to or less than 0.8S, is formed along the cutting edge $E_1$ of the chip breaker 5. In this way, if the entirety of the chip breaker is brought to a surface roughness equal to or less than 0.8S during the processing of the chip breaker 5, it is not necessary to again process the polished portion 5a.

According to the cutting insert constructed as described above, the following advantages can be produced. That is, since the polished portion 5a, whose surface roughness is equal to or less than 0.8S, is formed along the cutting edge $E_1$ of the chip breaker 5, deposition or fusion onto the cutting edge $E_1$ is unlikely, and chipping, or the like, is also unlikely, particularly in the case where aluminum, or the like, is cut. Furthermore, since chipping of the cutting edge $E_1$ can be made unlikely, it is possible that an angle contained between the cutting face and the flank (that is, an angle of the cutting edge) is formed sharp.

Furthermore, the width $B_1$ of the polished portion 5a is formed within the range of from 5% to 50% of the width $A_1$ of the chip breaker 5, and the surface roughness of the portion of the chip breaker 5 (except for the polished portion 5a) is formed within the range of from 0.5S to 10S. Accordingly, sliding resistance can be imparted to chips at the surface of the chip breaker 5, making it possible for the chips to curl into a spiral configuration.

In connection with the above, although the first embodiment has been described such that the high-hardness sintered section 3 is made of cemented carbide, the sintered section 3 may be made of other sintered alloys such as for example, cermet, and the like. However, it is necessary to select a material which ensures that the material can be fixed to the base plate by means of brazing like cemented carbide, and which ensures that the material can be chemically bonded to the super-hard sintered section.

Moreover, the polished portion 5a is formed along the cutting edge $E_1$ of the chip breaker 5. However, the chip breaker 5 may also be formed without the polished portion 5a, and may remain as a surface which is to be machined by electric discharge.

Figure 3:
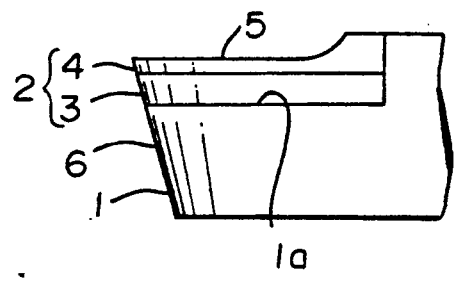
FIG. 3 is a view similar to FIG. 2, but showing a first modification of the first embodiment.

Furthermore, in addition to the cross-sectional configuration of the chip breaker 5 (as illustrated in FIG. 2) in which the positive rake angle is large, the cross-sectional configuration of the chip breaker 5 may be such that the upper surface of the chip breaker 5 is formed so as to extend in substantially parallel relation to the upper surface of the base plate 1 (as illustrated in FIG. 3). That is, as shown in FIG. 3, the chip breaker 5 has an upper surface which extends substantially in parallel relation to the upper surface of the corner 6 of the base plate 1. Obviously, the cross-sectional configuration of the chip breaker 5 may have a negative rake angle.

Figure 4:
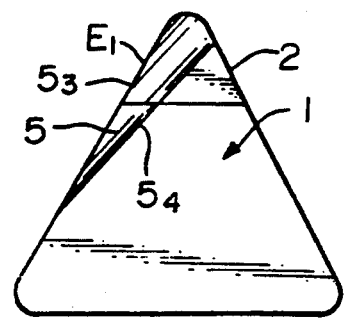
FIG. 4 is a top plan view of a second modification of the first embodiment.

Furthermore, as shown in FIG. 4, the chip breaker 5 has a leading edge $5_3$ serving as the cutting edge $E_1$ of the cutting-edge element 2, and a trailing edge $5_4$ extending in oblique relation to the leading edge $5_3$.

Figure 5:
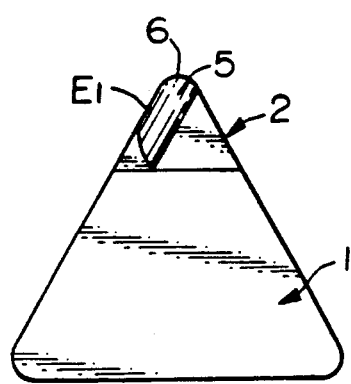
FIG. 5 is a top plan view of a third modification of the first embodiment.

Moreover, as illustrated in FIG. 5, the chip breaker 5 is formed only in the upper surface of the cutting-edge element 2.

Figure 6:
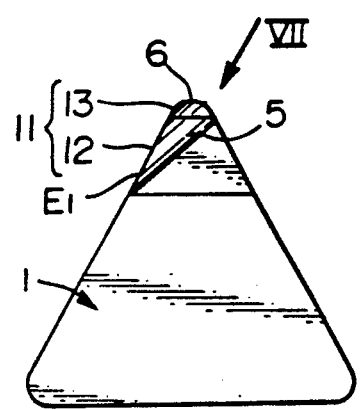
FIG. 6 is a top plan view of a cutting insert according to a second embodiment of the invention.
Figure 7:
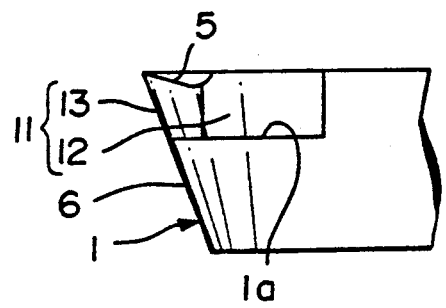
FIG. 7 is an enlarged fragmentary view as viewed from the arrow VII in FIG. 6.

Referring next to FIGS. 6 and 7, there is shown a cutting insert according to a second embodiment of the invention.

As shown in FIGS. 6 and 7, a cutting-edge element 11 is arranged such that a high-hardness sintered section 12 made of cemented carbide and a super-hard sintered section 13 are formed into a laminated configuration, and the direction of lamination extends radially with respect to the center of the base plate 1. That is, the high-hardness sintered section 12 and the super-hard sintered section 13 are super-imposed one upon the other in a direction parallel to the bottom surface of the cut-out 1a such that the super-hard sintered section 13 is located at a periphery of the base plate 1. The super-hard sintered section 13 is located radially outwardly with respect to the high-hardness sintered section 12, and forms a part of the outer peripheral surface of the base plate 1 at the corner 6 thereof.

A chip breaker 5 is formed on the upper surface of the cutting-edge element 11 and extends from the super-hard sintered section 13 to the high-hardness sintered section 12.

The cutting-edge element 11 is manufactured similarly to the cutting-edge element 2 described with reference to the previously described first embodiment and is brazed to the base plate 1.

The cutting insert constructed as described above has the following advantage. That is, since the super-hard sintered section 13, which is expensive, is arranged only at the forward end of the corner 6 in the base plate 1, an attempt can be made to reduce the cost of the cutting insert. Furthermore, the cutting insert according to the second embodiment can produce advantages similar to those produced by the first embodiment.

Figure 8:
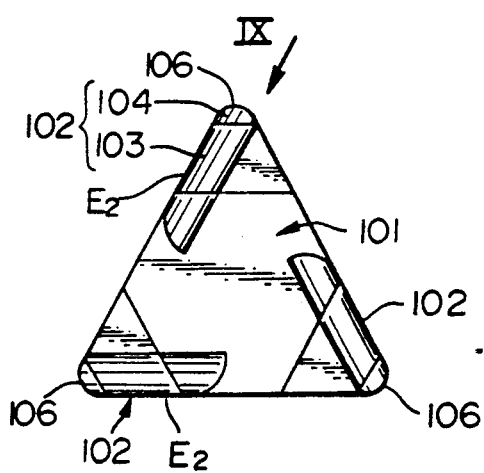
FIG. 8 is a top plan view of a cutting insert according to a third embodiment of the invention.
Figure 9:
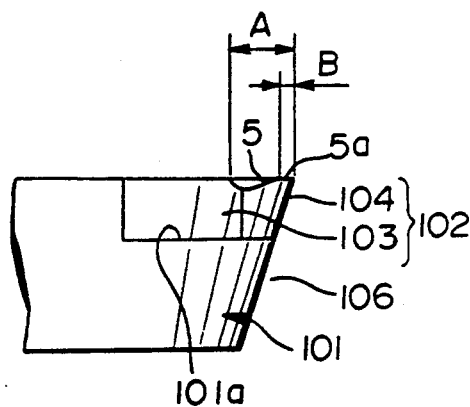
FIG. 9 is an enlarged fragmentary view as viewed from the arrow IX in FIG. 8.

Referring next to FIGS. 8 and 9, there is shown a cutting insert according to a third embodiment of the invention. The cutting insert comprises a base plate 101 which is formed into a triangular form having three corners 106. The corners 106 of the base plate 101 are formed therein with their respective cut-outs 101a. Three cutting-edge elements 102 are mounted respectively on upper surface of the respective corners 106 of the base plate 101. The upper surface of each of the corners 106 of the base plate 101 serves as a bottom surface of a corresponding one of the cut-outs 101a.

The high-hardness sintered section 103 and the super-hard sintered section 104 are superimposed one upon the other in a direction parallel to the bottom surface of the cut-out 101a such that the super-hard sintered section 104 is located at a periphery of the base plate 101.

In the manufacturing procedure of the cutting insert constructed as described above, the triangular cutting-edge element 102 is brazed to the cut-out 101a in the base plate 101 such that the face of the super-hard sintered section 104 (that is, the peripheral surface thereof) is directed toward the peripheral surface of the base plate 101. Subsequently, the cutting insert is polished at its upper, lower, and peripheral surfaces.

Figure 10:
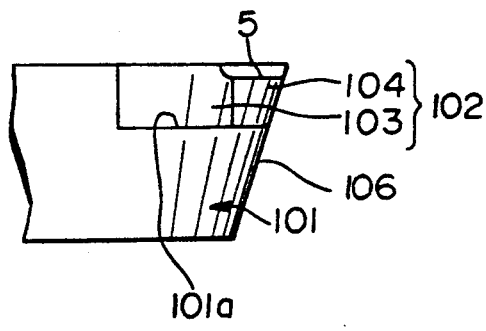
FIG. 10 is a view similar to FIG. 9, but showing a modification of the second embodiment.

In connection with the above, the cross-sectional configuration of the chip breaker 5 may be such that the upper surface of the chip breaker 5 is formed so as to extend substantially in parallel relation to the upper surface of the base plate (as illustrated in FIG. 10). That is, as shown in FIG. 10, the chip breaker 5 has an upper surface which extends substantially in parallel relation to the upper surface of the corner 106 of the base plate 101.

Figure 11:
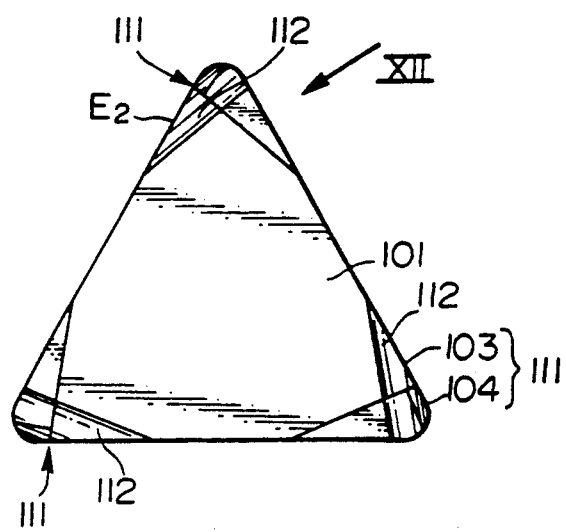
FIG. 11 is a top plan view of a cutting insert according to a fourth embodiment of the invention.
Figure 12:
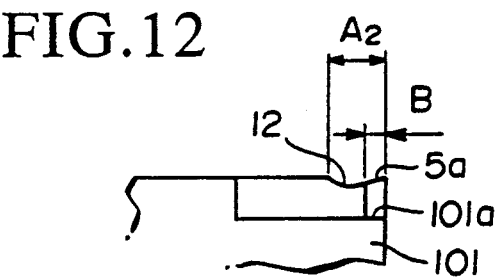
FIG. 12 is an enlarged fragmentary view as viewed from the arrow XII in FIG. 11.

Referring next to FIGS. 11 and 12, there is shown a cutting insert according to a fourth embodiment of the invention. The cutting insert illustrated in FIGS. 11 and 12 primarily differs from the cutting insert illustrated in FIGS. 8 and 9 in the shape of the cutting-edge element.

Specifically, a high-hardness sintered section 103 and a super-hard sintered section 104 are chemically coupled to each other in the process of being sintered simultaneously, thereby forming an element having a certain size. The cutting-edge element is brought down out of the aforesaid element. Thus, a cutting-edge element 111 is formed. Each of the cutting-edge elements 111 is formed generally into a rectangle in plan view as shown in FIG. 11. And the chip breaker has a width $A_2$ of 1.0 mm to 3.0 mm at the forward end of the cutting edge $E_2$.

The cutting insert constructed described above has the following advantages. That is, since the long side of the cutting-edge element 111 is so arranged as to extend along the cutting edge $E_2$, it is possible to obtain large portion of the cutting edge $E_2$ formed in the super-hard sintered section 104. Accordingly, even if the amount of the super-hard sintered section 104 used is the same, it is possible to produce a cutting insert which is superior in cutting quality or sharpness. Furthermore, the service life of the cutting insert can be prolonged, and the cutting insert according to the fourth embodiment can produce other advantages similar to those produced by the first embodiment.

Figure 14:
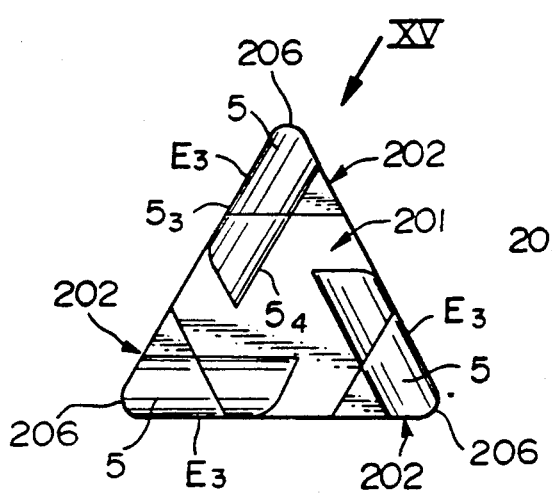
FIG. 14 is a top plan view of a cutting insert according to a fifth embodiment of the invention.
Figure 15:
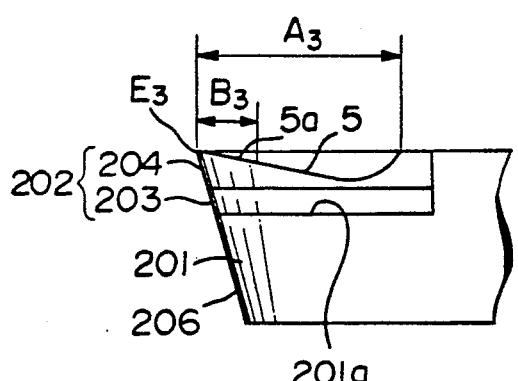
FIG. 15 is an enlarged fragmentary view as viewed from the arrow XV in FIG. 14.

Referring next to FIGS. 14 and 15, there is shown a cutting insert according to a fifth embodiment of the invention. The cutting insert comprises a base plate 201 having three corners 206. The corners 206 of the base plate 1 are formed therein with their respective cut-outs 201a. Cutting-edge elements 202 are mounted respectively on upper surfaces of the respective corners 206 of the base plate 201. The upper surfaces of the respective corners 206 of the base plate 1 serve respectively as bottom surfaces of the cut-outs 101a.

Each of the cutting-edge elements 202 is composed of a high-hardness sintered section 203 and a super-hard sintered section 204 which are superimposed one upon the other in a direction perpendicular to the bottom surface of the cut-out 201a.

Figure 16:
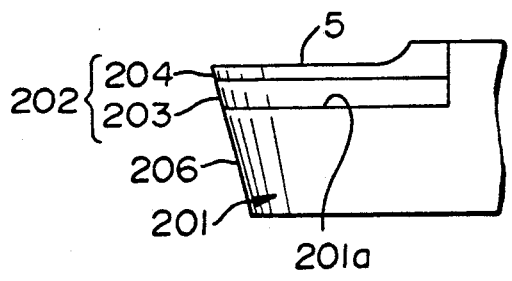
FIG. 16 is a view similar to FIG. 15, but showing a first modification of the fifth embodiment.

As shown in FIG. 16, the cross-sectional configuration of the chip breaker 5 may be such that the upper surface of the chip breaker 5 extends substantially in parallel relation to the upper surface of the base plate 201. That is, as shown in FIG. 16, the chip breaker has an upper surface which extends substantially in parallel relation to the upper surface of the corner 206 of the base plate 201.

Figure 17:
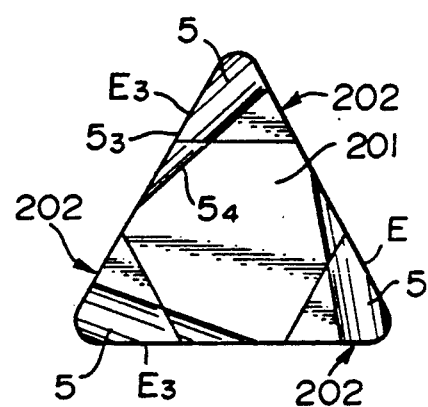
FIG. 17 is a top plan view of a second modification of the fifth embodiment.

Furthermore, as shown in FIG. 17, the chip breaker 5 has a leading edge $5_3$ serving as the cutting edge $E_3$ of the cutting-edge element 201, and a trailing edge 5₄ extending in oblique relation to the leading edge.

Figure 18:
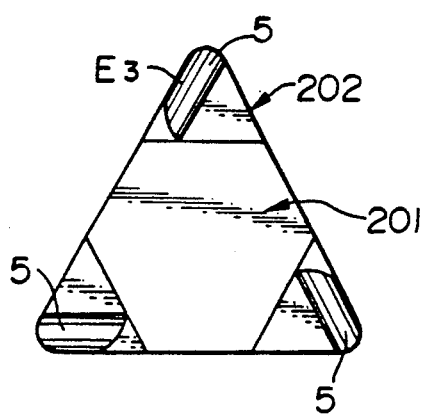
FIG. 18 is a top plan view of a third modification of the fifth embodiment.

Moreover, as illustrated in FIG. 18, the chip breaker 5 may be formed only in the upper surface of the cutting-edge element 202.

Figure 19:
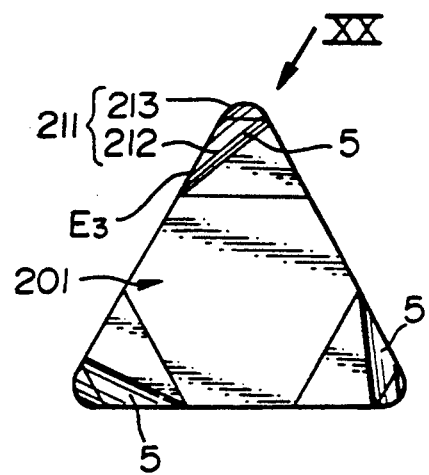
FIG. 19 is a top plan view of a cutting insert according to a sixth embodiment of the invention.
Figure 20:
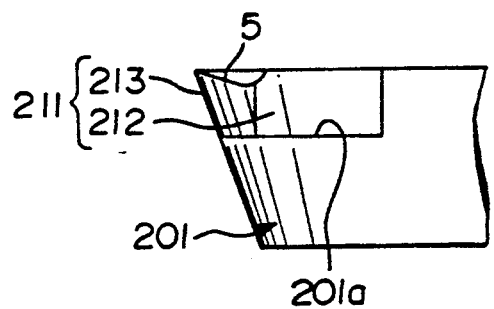
FIG. 20 is an enlarged fragmentary view as viewed from the arrow XX in FIG. 19.

Referring next to FIGS. 19 and 20, there is shown a cutting insert according to a sixth embodiment of the invention. In the sixth embodiment, a high-hardness sintered section 212 and a super-hard sintered section 213 are super-imposed one upon the other in a direction parallel to the bottom surface of the cut-out 201a such that the super-hard sintered section 213 is located at a periphery of the base plate 201.

Figure 21:
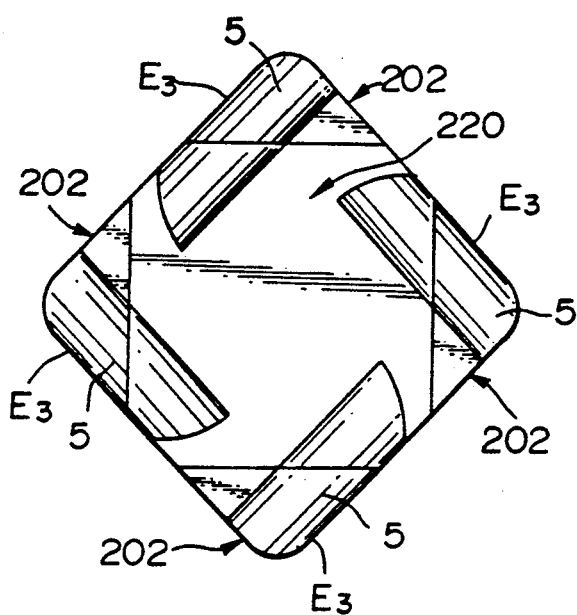
FIG. 21 is a top plan view of a cutting insert according to a seventh embodiment of the invention.

Referring next to FIG. 21, there is shown a cutting insert according to a seventh embodiment of the invention. The cutting insert illustrated in FIG. 21 primarily differs from the cutting insert illustrated in FIGS. 19 and 20 in the configuration of the base plate. That is, base plate 220 is formed into a square in plan view.

Figure 22:
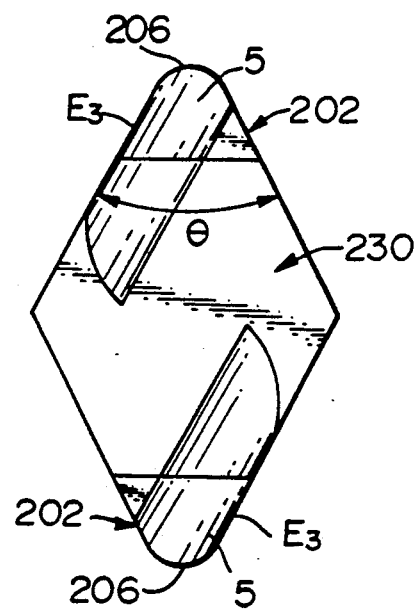
FIG. 22 is a top plan view of a cutting insert according to an eighth embodiment of the invention.

Referring next to FIG. 22, there is shown a cutting insert according to an eighth embodiment of the invention. The cutting insert illustrated in FIG. 22 primarily differs from the cutting insert illustrated in FIG. 21 in the configuration of the base plate. That is, base plate 230 is formed into a rhomboid in plan view. Specifically, a pair of opposed corners 206 and 206 of the base plate 230 are so formed as to have an angle $\theta$ of 55°.

Figure 23:
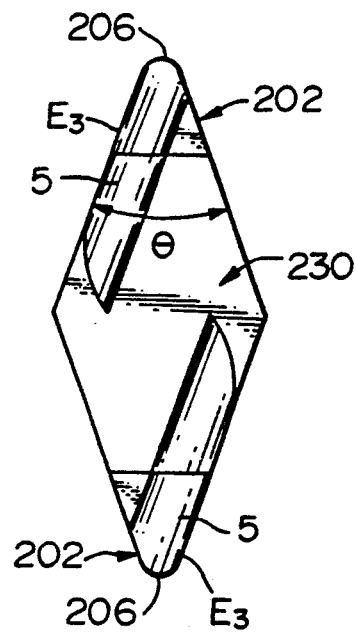
FIG. 23 is a top plan view of a modification of the eighth embodiment.

In a cutting insert illustrated in FIG. 23, a pair of opposed corners 206 and 206 of the base plate 230 are so formed as to have an angle $\theta$ of 35°.

Figure 24:
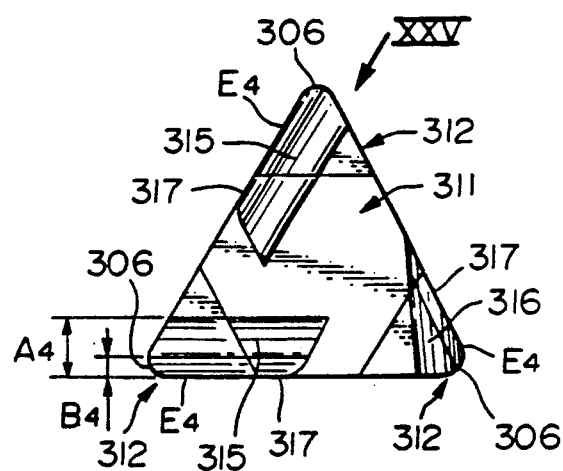
FIG. 24 is a top plan view of a cutting insert according to a ninth embodiment of the invention.
Figure 25:
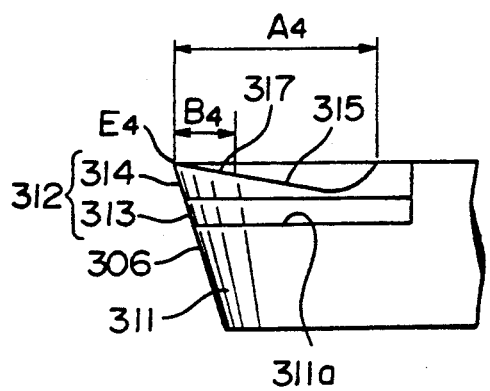
FIG. 25 is an enlarged fragmentary view as viewed from the arrow XXV in FIG. 24.

Referring next to FIGS. 24 and 25, there is shown a cutting insert according to a ninth embodiment of the invention. The cutting insert comprises a base plate 311 which is formed into a triangular configuration having three corners 306. The corners 306 of the base plate 301 are formed therein with their respective cut-outs 311a. Three cutting-edge elements 312 are mounted respectively on upper surfaces of the respective corners 306 of the base plate 311. The upper surface of each of the corners 306 of the base plate 311 serves as a bottom surface of a corresponding one of the cut-outs 311a.

Two of the corners 306 of the base plate 311 are formed therein with their respective first chip breakers 315 and 315 extending along the cutting edge E₄. The remaining corner 306 of the base plate 311 is formed therein with a second chip breaker 316 extending in oblique relation to the cutting edge E₄.

Each of the first chip breakers 315 is so formed as to have identical or constant width along the cutting edge E₄, while the second chip breaker 316 is so formed as to gradually narrow in width from the corner 306 along the cutting edge E₄.

Usually, the cutting edge E₄ adjacent to each of the first chip breakers 315 serves as a cutting edge for finishing, while the cutting edge E₄ adjacent to the second chip breaker 316 serves as a cutting edge for rough cutting.

In each of the chip breakers 315 and 316, a section of the width B₄ from the cutting edge E₄ is formed into a polished portion 317 which is polished to a surface roughness of a value equal to or less than 0.8S. The remaining portion of the chip breaker 315 or 316 is formed to have a surface roughness equal to or more than 0.5S and equal to or less than 10S. In this connection, it is preferable that the remaining portion of the chip breaker 315 or 316 (except for the polished portion 317) has a surface roughness equal to or more than 1.5S and equal to or less than 2.0S.

Furthermore, it is preferably that the width B₄ of the polished portion 317 be formed into dimensions equal to or more than 5% and equal to or less than 50% of the width A₄ of the chip breaker 315 or 316.

In the cutting insert constructed as described above, since the chip breakers 315 and 316 are different in configuration from each other depending upon the corners 306 of the base plate 301, changing the position of the corners 306 enables various cuttings such as rough cutting, finishing, and so on, to be done.

Accordingly, if, for example, rough cutting is changed to finishing, it is not required to replace the cutting insert with another one. Thus, it is possible to enhance or improve performance of the cutting operation.

Figure 26:
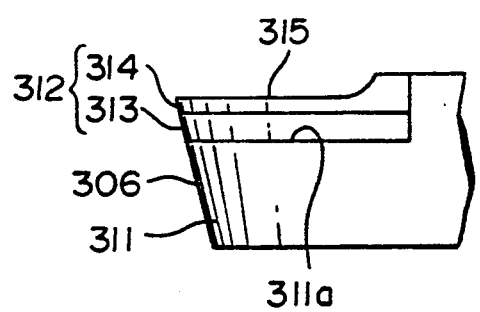
FIG. 26 is a view similar to FIG. 25, but showing a first modification of the ninth embodiment.

The cross-sectional configuration of the chip breaker 315 may be such that the upper surface of the chip breaker 315 is so formed as to extend substantially in parallel relation to the upper surface of the base plate 311, as illustrated in FIG. 26. That is, as shown in FIG. 26, the chip breaker 315 has its upper surface which extends substantially in parallel relation to the upper surface of the corner 306 of the base plate 311.

Figure 27:
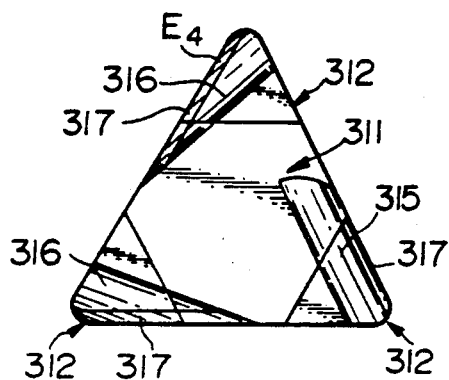
FIG. 27 is a top plan view of a second modification of the ninth embodiment.
Figure 28:
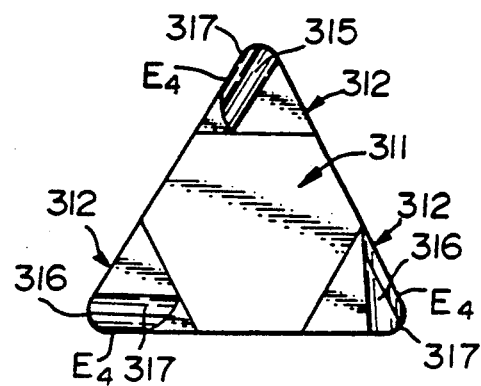
FIG. 28 is a top plan view of a third modification of the ninth embodiment.

In the above-described ninth embodiment, two first chip breakers 315 are provided respectively at the two corners 306 of the base plate 311, and a single second chip breaker 316 is provided at the remaining corner 306. As shown in FIG. 27, however, two second chip breakers 316 and 316 may be provided respectively at the corners 306 of the base plate 311. Furthermore, as shown in FIG. 28, the first and second chip breakers 315 and 316 may be formed only in respectively in the cutting-edge elements 312.

Figure 29:
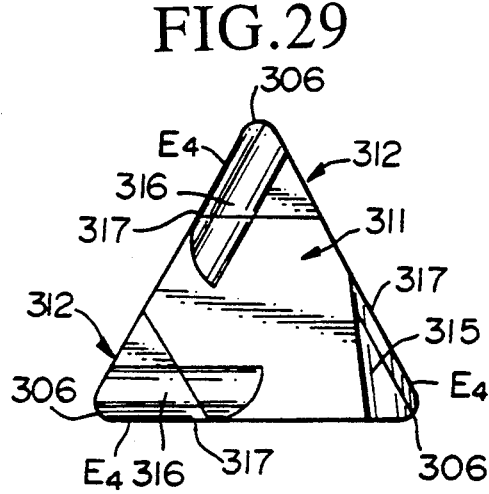
FIG. 29 is a top plan view of a cutting insert according to a tenth embodiment of the invention.

Referring next to FIG. 29, there is shown a cutting insert according to a tenth embodiment of the invention. The cutting insert illustrated in FIG. 29 primarily differs from the cutting insert illustrated in FIGS. 24 and 25 in that one of the corners 306 of the base plate 311 is not provided with a cutting-edge element.

That is, the first chip breaker 315 is directly processed, by means of electric discharge machining or polishing, in the base plate 311 at the corner 306 thereof at which the cutting-edge element 312 is not provided.

According to the cutting insert constructed as described above, there can be produced the following advantage. That is, it is possible to cope with various works to be cut, depending upon the hardness thereof, and the like. For example, in the case where a material having high hardness is processed, the material is cut by the first chip breakers 315, while, in the case where a material having low hardness is processed, the second chip breakers 316 are used.

In connection with the above, it is clear that a chip breaker, which is to be formed at a portion where the cutting-edge element 312 does not exist, may have the shape of that of the first chip breakers 315.

Figure 30:
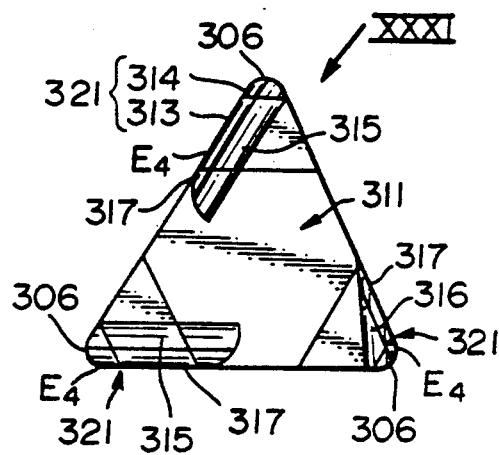
FIG. 30 is a top plan view of a cutting insert according to an eleventh embodiment of the invention.
Figure 31:
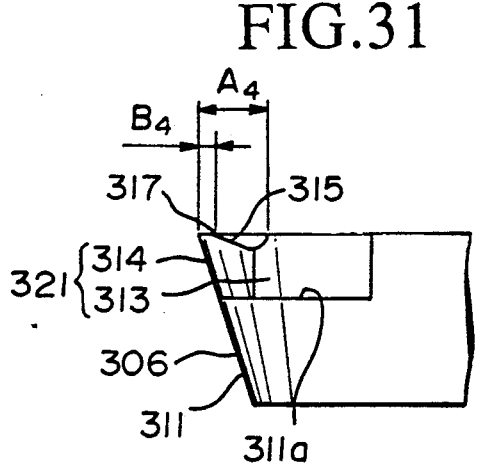
FIG. 31 is an enlarged fragmentary view as viewed from the arrow XXXI in FIG. 30.

Referring next to FIGS. 30 and 31, there is shown a cutting insert according to an eleventh embodiment of the invention. The cutting insert comprises a base plate 311 which is formed into a triangular configuration having three corners 306. The corners 306 of the base plate 311 are formed therein with their respective cut-outs 311a. Three cutting-edge elements 321 are mounted respectively on upper surfaces of the respective corners 306 of the base plate 311. The upper surface of each of the corners 306 of the base plate 311 serves as a bottom surface of a corresponding one of the cut-outs 311a.

In the eleventh embodiment, the cutting-edge element 321 has a high-hardness sintered section 313 and a super-hard sintered section 314. The high-hardness sintered section 313 and the super-hard sintered section 314 are superimposed one upon the other in a direction parallel to the bottom surface of the cut-out such that the super-hard sintered section 314 is located at a periphery of the base plate 311.

Two of the corners 306 of the base plate 311 are formed therein with their respective first chip breakers 315 and 315 extending along the cutting edge $E_4$. The remaining corner 306 of the base plate 311 is formed therein with a second chip breaker 316 extending in oblique relation to the cutting edge $E_5$.

Each of the first and second chip breakers 315 and 316 is formed with a polished portion 317 of a width $B_4$.

Figure 32:
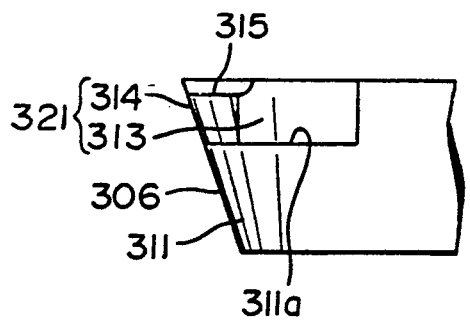
FIG. 32 is a view similar to FIG. 31, but showing a modification of the eleventh embodiment illustrated in FIGS. 30 and 31.

As shown in FIG. 32, the cross-sectional configuration of the chip breaker 315 may be such that the upper surface of the chip breaker 315 extends substantially in parallel relation to the upper surface of the base plate as illustrated in FIG. 32. That is, as shown in FIG. 32, the chip breaker 315 has an upper surface which extends substantially in parallel relation to the upper surface of the corner 306 of the base plate 311.

Figure 33:
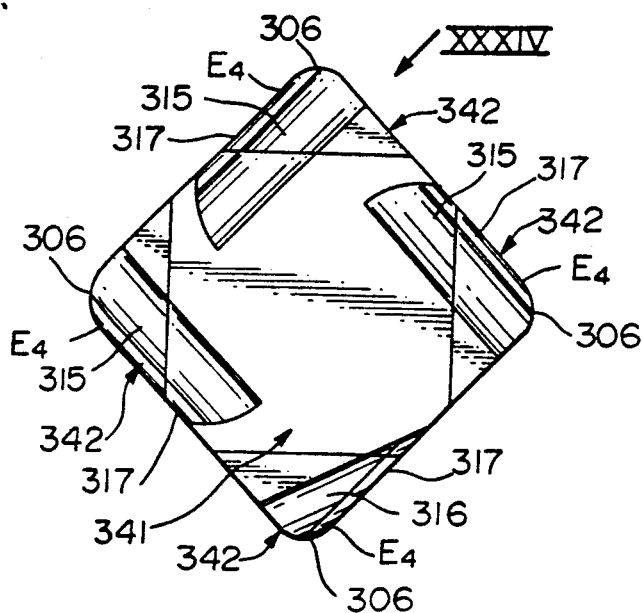
FIG. 33 is a top plan view of a cutting insert according to a twelfth embodiment of the invention.
Figure 34:
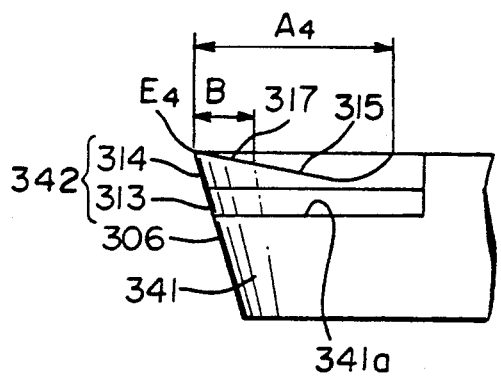
FIG. 34 is an enlarged fragmentary view as viewed from the arrow XXXIV in FIG. 33.

Referring next to FIGs. 33 and 34, there is shown a cutting insert according to a twelfth embodiment of the invention. The cutting insert illustrated in FIGS. 33 and 34 primarily differs from the cutting insert illustrated in FIGS. 30 and 31 in the shape of the base plate. That is, the base plate 341 is formed into a square configuration in plan view.

Three of four corners of the base plate 341 are formed therein with respective chip breakers 315, and the remaining corner of the base plate 341 is formed therein with a chip breaker 316.

Figure 35:
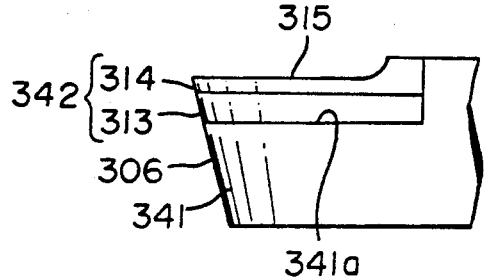
FIG. 35 is a view similar to FIG. 34, but showing a modification of the twelfth embodiment.

In connection with the above, the cross-sectional configuration of the chip breaker 315 may be such that the upper surface of the chip breaker 315 extends substantially in parallel relation to the upper surface of the base plate 341 as illustrated in FIG. 35. That is, as shown in FIG. 35, the chip breaker 315 has an upper surface which extends substantially in parallel relation to the upper surface of the corner 306 of the base plate 341.

Figure 36:
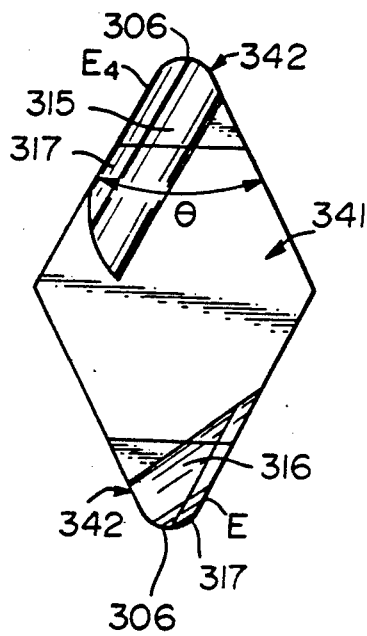
FIG. 36 is a top plan view of a cutting insert according to a thirteenth embodiment of the invention.

Referring next to FIG. 36, there is shown a cutting insert according to a thirteenth embodiment of the invention. The cutting insert illustrated in FIG. 36 is primarily differs from the cutting insert illustrated in FIGS. 33 and 34 in the configuration of the base plate. That is, the base plate 341 is formed into a rhomboid configuration in plan. Specifically, a pair of opposed corners 306 of the base plate 341 are so formed as to have an angle $\theta$ of 55°.

A first chip breaker 315 is formed in one of the pair of opposed corners 306 of the base plate 341, while a second chip breaker 316 is formed in the other corner 306 of the base plate 341.

Figure 37:
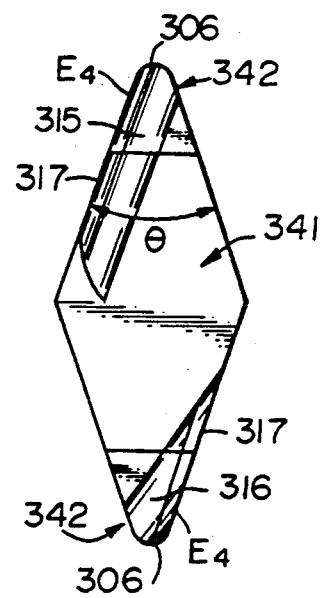
FIG. 37 is a view similar to FIG. 36, but showing a modification of the thirteenth embodiment illustrated in FIG. 36.

In a cutting insert illustrated in FIG. 37, a pair of opposite corners 306 of the base plate 341 are so formed as to have an angle $\theta$ of 35°.

Figure 38:
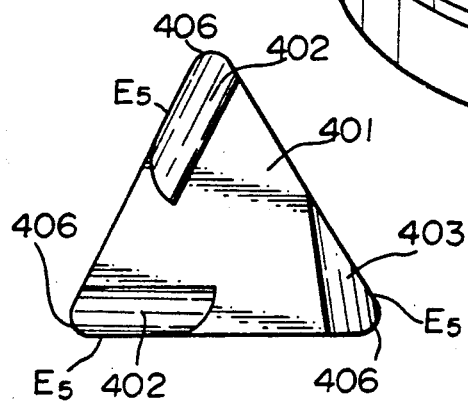
FIG. 38 is a top plan view of a cutting insert according to a fourteenth embodiment of the invention.

Referring next to FIG. 38, there is shown a cutting insert according to a fourteenth embodiment of the invention. The cutting insert comprises a cutting-insert body (hereinafter referred simply to "tip body") 401 formed into the shape of a regular triangle. The tip body 401 is made of a material identical with that with which the base plate 401 of the first embodiment, illustrated in FIGS. 1 and 2, is made.

The tip body 401 has an upper surface serving as a cutting face which has three corners 406. A pair of first chip breakers 402 and 402 are formed respectively at two of the three corners 406, while a second chip breaker 403 is formed at the remaining corner 406.

Each of the first chip breakers 402 is so formed as to have an identical or constant width along the cutting edge $E_5$, while the second chip breaker 403 is so formed as to have a width which is gradually narrowed from the corner 406 along the cutting edge $E_5$.

Usually, the cutting edges $E_5$ adjacent to the first chip breakers 402 serve as cutting edges for finishing, while the cutting edge $E_5$ adjacent to the second chip breaker 403 serves as a cutting edge for rough cutting.

In the cutting insert constructed as described above, since the chip breakers 402 and 403 are different in configuration from each other depending upon the corners 406 of the tip body 401, a change of position of the corners 406 enables various types of cutting such as rough cutting, finishing and so on, to be performed.

Accordingly, if, for example, rough cutting is changed to finishing, it is not necessary to replace the cutting insert with another one. Thus, it is possible to improve the performance of cutting operation.

Figure 39:
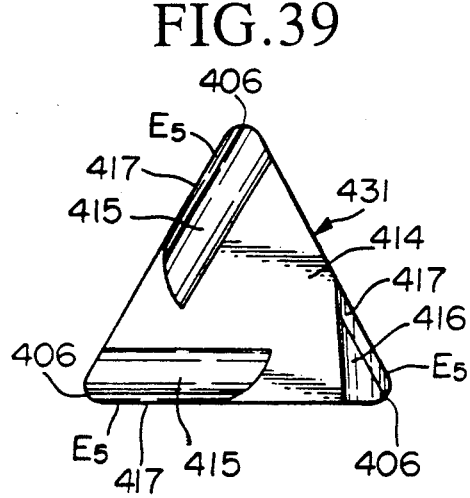
FIG. 39 is a top plan view of a cutting insert according to a fifteenth embodiment of the invention.
Figure 40:
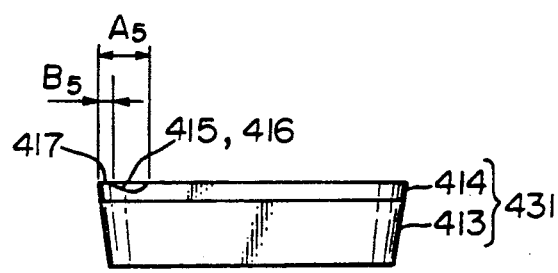
FIG. 40 is a side elevational view of the cutting insert illustrated in FIG. 39.
Figure 41:
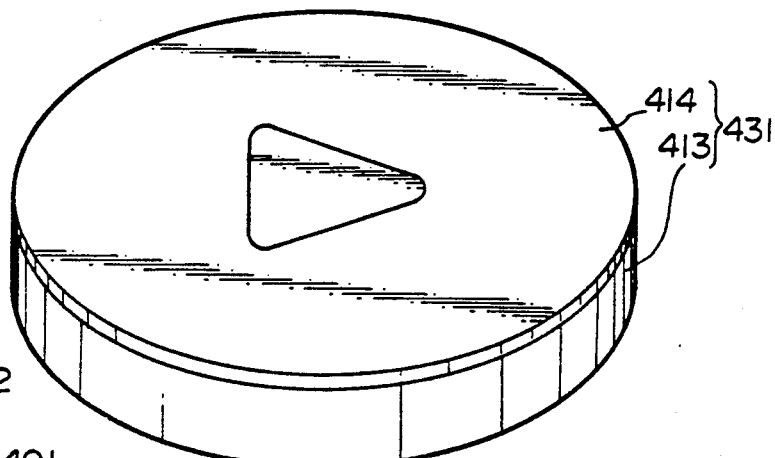
FIG. 41 is a perspective view showing a material out of which the cutting insert illustrated in FIGS. 39 and 40 is brought down.

Referring next to FIGS. 39 through 41, there is shown a cutting insert according to a fifteenth embodiment of the invention. The cutting insert comprises a tip body 431 which is composed of a high-hardness sintered section 413 and a super-hard sintered section 414 which is so formed as to be laminated in a layer upon the high-hardness sintered section 413.

That is, the high-hardness sintered section 413 and the super-hard sintered section 414 are chemically coupled to each other in the process of being sintered simultaneously, thereby forming an element having a certain size as illustrated in FIG. 41. A triangular element is brought down out of the aforesaid element, thus forming the tip body 431.

The tip body 431 has an upper surface serving as a cutting face which has three corners 406. By means of electric discharge machining or polishing, a pair of first chip breakers 415 and 415 are formed respectively at two of the three corners 406, while a second chip breaker 416 is formed at the remaining corner.

The first and second chip breakers 415 and 416 are formed with their respective polished portions 417 which have a width $B_5$ and which extend respectively along the cutting edges $E_5$.

According to the cutting insert constructed as described above, the following advantages can be produced. That is, the super-hard sintered section 414, which is expensive, is provided only on the upper surface of the tip body 431 to serve as the cutting face. Furthermore, time and labor for brazing, or the like, is not required so that it is possible to provide a finished product which is lower in cost.

EXAMPLE

The cutting inserts 1 to 3 having the same features as the cutting insert shown in FIGS. 11 and 12, were prepared as the cutting inserts of this invention. These cutting inserts 1, 2, and 3 of this invention have chip breaker widths of 1.0 mm, 1.7 mm and 3.0 mm, respectively.

For comparison purposes, three cutting inserts having the chip breaker width not falling within the range of this invention were prepared as the comparison cutting inserts 1 to 3.

Figure 13:
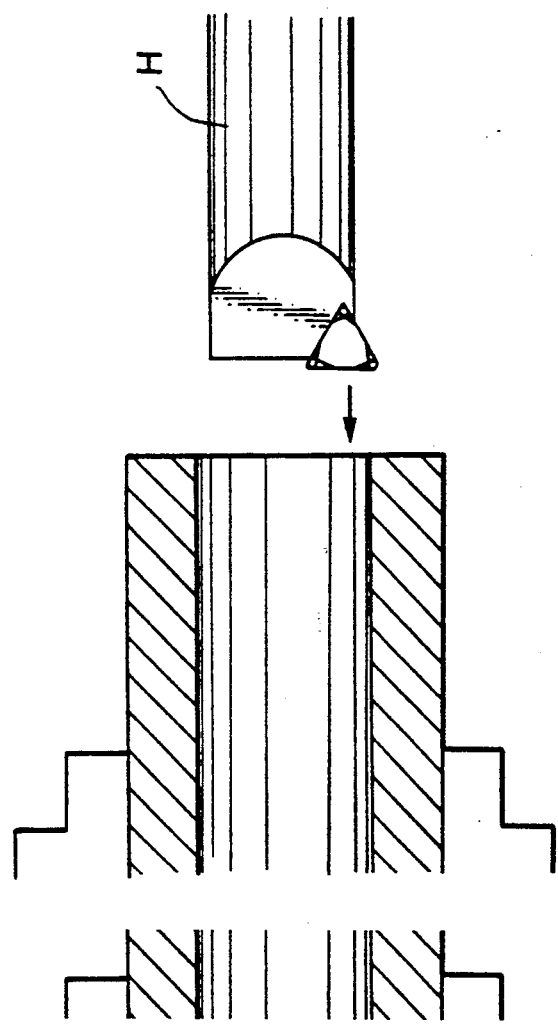
FIG. 13 is a longitudinal sectional view showing the cutting test using a cutting insert shown in FIGS. 11 and 12.

The cutting inserts 1 to 3, and the comparison cutting inserts 1 to 3, were each attached to a holder H as shown in FIG. 13 and were subjected to cutting tests to observe the shape of the resulting chips. The conditions for the cutting test were as follows:

Workpiece: Aluminum JIS H4000,A1050 (ISO R209-1971,A199.5)
Cutting speed: 400 m/min., 800 m/min.
Feed rate: 0.08 mm/revolution
Depth of cut: 0.18 mm
Cutting oil: water soluble cutting oil After this cutting test, the shape of the chips were observed. The results obtained are shown in TABLE 1. In the TABLE 1, the symbol "O" shows a condition in which all of the chips were curled spirally; the symbol "O'" shows a condition in which the chips were generally curled spirally, although a few chips were discharged without being curled, and the symbol "X" shows a condition that the chips were generally discharged without being curled.

TABLE 1

| Kinds of cutting insert | Width of chip breaker | Cutting speed (m/min.) 400 | 800 |
|---|---|---|---|
| Inserts of this invention | | | |
| 1 | 1.0 mm | O' | O |
| 2 | 1.7 mm | O | O |
| 3 | 3.0 mm | O' | O' |
| Comparison cutting inserts | | | |
| 1 | none | X | X |
| 2 | 0.8 mm | X | X |
| 3 | 3.5 mm | X | X |

As seen from TABLE 1, the cutting inserts 1 to 3 of this invention are capable of curling chips under the cutting speed of 400 m/min. and 800 m/min. It is understood that the width of the chip breaker may be preferably determined in the range of 1.0 mm to 3.0 mm in order to effectively curl the chips.

What is claimed is:

1. A cutting insert comprising a base plate formed into a polygonal form having a plurality of corners, and at least one cutting-edge element mounted on an upper surface of one of the corner of said base plate,
   wherein said cutting-edge element is composed of a high-hardness sintered section and a super-hard sintered section which are superimposed one upon the other, said cutting-edge element being brazed to the upper surface of the corner of said base plate under such a condition that said super-hard sintered section is exposed to an upper surface of said base plate, and
   wherein said super-hard sintered section has an upper surface which has formed therein a chip breaker whose surface roughness is within a range of from 0.5S to 10S.

2. A cutting insert according to claim 1, wherein said cutting-edge element has a cutting edge, and wherein said chip breaker has two portions, said portion nearest said cutting edge having a surface roughness of at most 0.8S over 5% to 50% of the width of said chip breaker and the remaining portion having a surface roughness of from 0.5S to 10S.

3. A cutting insert according to claim 1, wherein said chip breaker has a width of 1.0 mm to 3.0 mm at the forward end of the cutting edge.

4. A cutting insert according to claim 1, wherein said high-hardness sintered section is made of cemented carbide having as the main component a component selected from the group consisting of tungsten carbide and cermet, while said super-hard sintered section has as the main component a component selected from the group consisting of diamond and cubic-system boron nitride.

5. A cutting insert according to claim 2, wherein said portion of said chip breaker nearest said cutting edge serves as a polished portion having a surface roughness of at most 0.8S.

6. A cutting insert according to claim 5, wherein said remaining portion of said chip breaker has a surface roughness within a range of from 1.5S to 2.0S.

7. A cutting insert according to claim 1, wherein said chip breaker has a positive rake angle.

8. A cutting insert according to claim 1, wherein said cutting-edge element has a cutting edge, and wherein said chip breaker has a leading edge serving as said cutting edge of said cutting-edge element, and a trailing edge extending in oblique relation to said leading edge.

9. A cutting insert according to claim 1, wherein said chip breaker is formed only in the upper surface of said cutting-edge element.

10. A cutting insert according to claim 1, wherein said one corner of said base plate is formed therein with a cut-out, said upper surface of the corner of said base plate serving as a bottom surface of said cut-out, and wherein said high-hardness sintered section and said super-hard sintered section are superimposed one upon the other in a direction parallel to the bottom surface of said cut-out such that said super-hard sintered section is located at a periphery of said base plate.

11. A cutting insert according to claim 1, wherein said chip breaker has an upper surface which extends substantially in parallel relation to the upper surface of the corner of said base plate.

12. A cutting insert according to claim 1, wherein said cutting-edge element has a cutting edge, and wherein said chip breaker has a leading edge serving as said cutting edge of said cutting-edge element, and a trailing edge extending in parallel relation to said leading edge.

13. A cutting insert according to claim 1, wherein said chip breaker has a first section formed in the upper surface of said cutting-edge element and a second section formed in the upper surface of said base plate.

14. A cutting insert according to claim 1, wherein the corner of said base plate is formed therein with a cut-out, said upper surface of the corner of said base plate serving as a bottom surface of said cut-out, and wherein said high-hardness sintered section and said super-hard sintered section are superimposed one upon the other in a direction perpendicular to the bottom surface of said cut-out.

15. A cutting insert according to claim 1, comprising a plurality of cutting-edge elements mounted respectively on upper surfaces of the respective corners of said base plate.

16. A cutting insert according to claim 15, wherein said corners of said base plate are formed therein with their respective cut-outs, said upper surfaces of the respective corners of said base plate serving respectively as bottom surfaces of the respective corners of said base plate, and wherein the high-hardness sintered section and the super-hard sintered section of each of said cutting-edge elements are superimposed one upon the other in a direction parallel to the bottom surface of a corresponding one of said cut-outs such that the super-hard sintered section is located at a periphery of said base plate.

17. A cutting insert according to claim 15, wherein said cutting-edge elements have their respective cutting edges, wherein the upper surfaces of the respective super-hard sintered sections are formed therein with respective chip breakers, wherein a first one of the chip breakers has a first leading edge serving as the cutting edge of a corresponding one of said cutting-edge elements, and a trailing edge extending in parallel relation to the first leading edge, and a second one of the chip breakers has a second leading edge serving as the cutting edge of a corresponding one of said cutting-edge elements, and a trailing edge extending in oblique relation to said second leading edge.

18. A cutting insert according to claim 15, wherein each of said cutting-edge elements is formed generally into a rectangular configuration as viewed in plan, and is formed generally into a triangular configuration as viewed in side elevation.

19. A cutting insert according to claim 18, wherein said cutting edge elements have respective cutting edges, each of said cutting-edge elements having opposed long sides one of which extends along a corresponding one of said cutting edges.

20. A cutting insert according to claim 1, wherein said base plate is triangular in plan view.

21. A cutting insert according to claim 1, wherein said base plate is rectangular in plan view.

22. A cutting insert according to claim 21, wherein the super-hard sintered section is exposed to the upper surface of said base plate.

23. A cutting insert according to claim 1, wherein said base plate is square in plan view.

24. A cutting insert according to claim 1, wherein said base plate is rhomboid in plan view.

25. A cutting insert according to claim 24, wherein said rhomboid base plate has four sides, and wherein a pair of opposing sides of said four sides of said rhomboid base plate have respective angles of 55°, and wherein a pair of cutting-edge elements are brazed respectively to said pair of opposed sides of said rhomboid base plate such that the super-hard sintered section of each of said cutting-edge elements is exposed to said upper surface of said base plate.

26. A cutting insert according to claim 24, wherein said rhomboid base plate has four sides, and wherein a pair of opposing sides of said four sides of said rhomboid base plate have respective angles of 35°, and wherein a pair of cutting-edge elements are brazed to said pair of opposed sides of said rhomboid base plate such that the super-hard sintered section of each of said cutting-edge elements is exposed to said upper surface of said plate.

27. A cutting insert comprising a base plate formed into a polygonal shape having a plurality of corners, and a plurality of cutting-edge elements mounted respectively on upper surfaces of the respective corners of said base plate,
    wherein each of said cutting-edge elements is composed of a high-hardness sintered section and a super-hard sintered section which are superimposed one upon the other, the cutting-edge element being brazed to the upper surface of a corresponding one of the corners of said base plate under such a condition that the super-hard sintered section is exposed to an upper surface of said base plate,
    wherein the super-hard sintered section of each of said cutting-edge elements has an upper surface which is formed with a chip breaker, whose surface roughness is within a range of from 0.5 S to 10 S, and
    wherein at least one of said chip breakers differs in shape from the remaining chip breakers.

28. A cutting insert according to claim 27, wherein said cutting-edge elements have their respective cutting edges, and wherein said chip breaker has two portions, said portion nearest said cutting edge having a surface roughness of at most 0.8 S over 5% to 50% of the width of said chip breaker and the remaining portion having a surface roughness of from 0.5 S to 10 S.

29. A cutting insert according to claim 27, wherein each of said chip breakers has a width of 1.0 mm to 3.0 mm at the forward end of the cutting edge.

30. A cutting insert according to claim 27, wherein the high-hardness sintered section of each of said cutting-edge elements is made of cemented carbide whose main component is one of tungsten carbide and cement, while the super-hard sintered section of the cutting-edge element has as its main component one of diamond and cubic-system boron nitride.

31. A cutting insert according to claim 28, wherein the portion of each of said chip breakers serves as a polished portion whose surface roughness is at most 0.8 S.

32. A cutting insert according to claim 31, wherein the remaining portion of the chip breaker has a surface roughness within a range of from 1.5 S to 2.0 S.

33. A cutting insert according to claim 27, wherein each of said chip breakers has a positive rake angle.

34. A cutting insert according to claim 27, wherein each of said chip breakers has an upper surface which extends substantially in parallel relation to the upper surface of a corresponding one of the corners of said base plate.

35. A cutting insert according to claim 27, wherein said cutting-edge elements have their respective cutting edges, and wherein each of said chip breakers has a leading edge serving as the cutting edge of a corresponding one of said cutting-edge elements, and a trailing edge extending in parallel relation to said leading edge.

36. A cutting insert according to claim 27, wherein said cutting-edge elements have respective cutting edges, and wherein each of said chip breakers has a leading edge serving as the cutting edge of a corresponding one of said cutting-edge elements, and a trailing edge extending in oblique relation to said leading edge.

37. A cutting insert according to claim 27, wherein each of said chip breakers is formed only in the upper surface of a corresponding one of said cutting-edge elements.

38. A cutting insert according to claim 27, wherein each of said chip breakers has a first section formed in the upper surface of a corresponding one of said cutting-edge elements and a second section formed in the upper surface of said base plate.

39. A cutting insert according to claim 27, wherein the corners of said base plate are formed therein with their respective cut-outs, the upper surface of a corresponding one of the corners of said base plate serving as a bottom surface of a corresponding one of said cut-outs, and wherein the high-hardness sintered section and the super-hard sintered section of each of said cutting-edge elements are superimposed one upon the other in a direction perpendicular to the bottom surface of a corresponding one of said cut-outs.

40. A cutting insert according to claim 27, wherein the corners of said base plate are formed therein with their respective cut-outs, the upper surface of a corresponding one of the corners of said base plate serving as a bottom surface of a corresponding one of said cut-outs, and wherein the high-hardness sintered section and the super-hard sintered section of each of said cutting-edge elements are superimposed one upon the other in a direction parallel to the bottom surface of a corresponding one of said cut-outs such that the super-hard sintered section is located at a periphery of said base plate.

41. A cutting insert according to claim 27, wherein said cutting-edge elements have their respective cutting edges, wherein a first one of said chip breakers has a first leading edge serving as the cutting edge of a corresponding one of said cutting-edge elements, and a trailing edge extending in parallel relation to the first leading edge, and a second one of said chip breakers has a second leading edge serving as the cutting edge of a corresponding one of said cutting edge elements, and a trailing edge extending in oblique relation to said second leading edge.

42. A cutting insert according to claim 27, wherein each of said cutting-edge elements if formed generally into a rectangular configuration as viewed in plan, and is formed generally into a triangular configuration as viewed in side elevation.

43. A cutting insert according to claim 42, wherein said cutting edge elements have their respective cutting edges, wherein each of said cutting-edge elements has opposed long sides, one of which extends along a corresponding one of said cutting edges.

44. A cutting insert according to claim 27, wherein said base plate is triangular in plan view.

45. A cutting insert according to claim 27, wherein said base plate is rectangular in plan view.

46. A cutting insert according to claim 27, wherein the super-hard sintered section of each of said cutting-edge elements is exposed to the super surface of said base plate.

47. A cutting insert according to claim 27, wherein said base plate is square in plan view.

48. A cutting insert according to claim 27, wherein said base plate is rhomboid in plan view.

49. A cutting insert according to claim 48, wherein said rhomboid base plate has four sides, and wherein a pair of opposed ones of said four sides of said rhomboid base plate have respective angles of 551 k, and wherein a pair of cutting-edge elements are brazed respectively to said pair of opposed sides of said rhomboid based plate such that the super-hard sintered section of each of said cutting-edge elements is exposed to said upper surface of said base plate.

50. A cutting insert according to claim 48, wherein said rhomboid base plate has four sides, and wherein a pair of opposed ones of said four sides of said rhomboid base plate have respective angles of 351 k, and wherein a pair of cutting-edge elements are brazed to said pair of opposed sides of said rhomboid base plate such that the super-hard sintered section of each of said cutting-edge elements is exposed to said upper surface of said base plate.

* * * * *